C. R. JENNE.
ANIMAL TRAP.
No. 181,446.　　　　　　　　　　Patented Aug. 22, 1876.
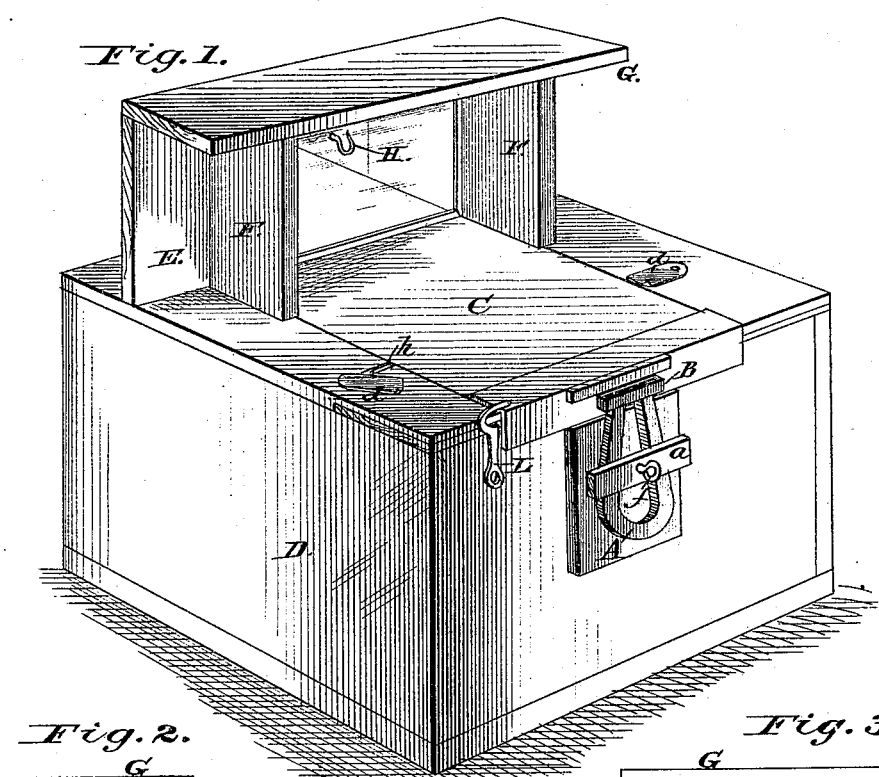
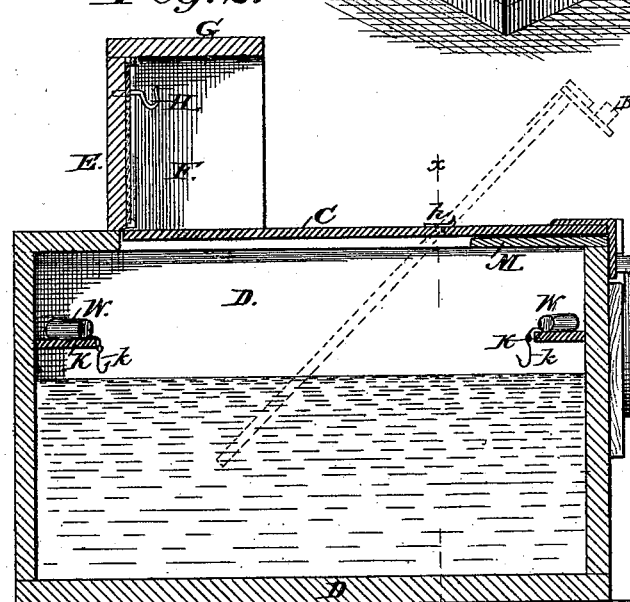
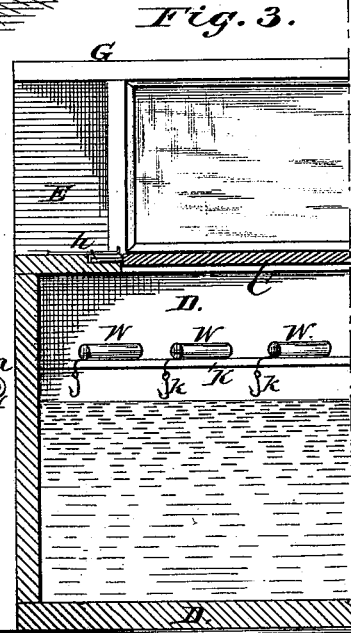

UNITED STATES PATENT OFFICE.

CHANCY R. JENNE, OF OKOLONA, MISSISSIPPI.

IMPROVEMENT IN ANIMAL-TRAPS.

Specification forming part of Letters Patent No. 181,446, dated August 22, 1876; application filed May 31, 1876.

*To all whom it may concern:*

Be it known that I, CHANCY R. JENNE, of Okolona, county of Chickasaw, and State of Mississippi, have invented certain new and useful Improvements in Animal-Traps, of which the following is a specification, reference being had to the accompanying drawings, and the letters of reference marked thereon.

Figure 1 is a perspective view of my improved trap. Fig. 2 is a central longitudinal section, and Fig. 3 a sectional elevation upon a plane passing through the axis of the fall.

The object of the invention is, first, to provide a simple, effective, and automatic means for holding the fall of the trap until the animal to be caught has passed sufficiently beyond the hinges thereof to insure his precipitation into the well below, and prevent his scrambling back beyond the line of the said hinges; second, to provide means by which the animal, when caught in the well, will be speedily drowned.

To accomplish the first object of my invention, I place an ordinary horseshoe-magnet, A, and its armature B at the front of the fall C, and in front of the hinges $h$. The fall C, as is ordinarily the case in this class of traps, is balanced upon its hinges, and arranged over the well D, in such a manner that when the animal passes beyond the line of the said hinges his weight causes the fall to tip, and the animal to be precipitated below. It frequently occurs that as a small portion of the weight of the animal passes beyond the said line the fall is moved, and he, becoming alarmed, retreats. To prevent this, and to hold the fall until all or a considerable portion of the animal's body is upon the tipping part thereof, I attach the armature B in front of the hinges, and the magnet A upon the stationary part of the trap, (though this arrangement may be reversed,) and in such relation to each other that when the trap is set they will come in contact, and their magnetic influences be exerted to keep them together.

It will be readily seen that when the magnet and armature are brought into contact and the trap set, the animal to be caught must pass so far beyond the axis of the fall or the line of the hinges as that that portion of his weight beyond the axis must be sufficient to overcome the weight of the front part of the fall, together with the attractive force of the magnet for its armature.

By varying the strength of the magnet the animal may be compelled to approach as near to the bait as is desirable, or the trap adapted to catch animals of various sizes. These objects may also be attained by making the armature and magnet adjustable with respect to each other in any convenient way, and thus control the effective force of one upon the other. In the present instance the bar $a$ is firmly held against the magnet A by means of the screw $f$, which permits the lowering of the magnet or its adjustment at pleasure.

I make the upper surface of the fall smooth, and then coat the same with shellac or other varnish or grease. When the fall begins to tip, and the animal becomes frightened, this coating prevents his obtaining a foothold, and he is therefore the more easily caught.

To prevent the animal from approaching the bait without first treading upon the fall, I erect a wall or barricade, E, around the tipping end thereof. It is provided with sides and top F and G, of sufficient extent to keep the bait upon the bait-hooks H beyond the reach of the largest animals of the class for which the trap is set. This barricade also constitutes a frame or holder for a looking-glass, in case it should be deemed expedient to use one. One bait-hook will be sufficient, if the trap be properly proportioned for the uses intended, since the fall will tip before the bait can be touched. If set for a miscellaneous catch, or for a variety of animals, these hooks may be multiplied, as desired.

To accomplish the second object of my invention, I place any number of hooks $k$ upon pins or shelves K around the interior wall of the well D, upon which hooks are secured weights of proper or sufficient size. The animal being precipitated into the well, now supposed to be partially filled with water, will, for a considerable time, swim around and endeavor to escape. The hooks upon the weights W are so placed that in his struggles he will be caught upon one or the other, and will displace the weight from its sustaining shelf or pin K, which weight will then operate to hold him beneath the surface of the water. This contrivance is found very effective in speedily putting an end to the captive's sufferings, and at once humanely removes his misery, and prevents his efforts for escape from alarming other animals without.

At L is shown a hook, by means of which the fall may be secured from tipping. This is intended to be used when the trap is being transported, or when it is desired to accustom the animals to traverse the fall in search of bait or food.

The guard M prevents the animal which may be captured from forcing up the front of the fall, and the covers $d\ d$ upon the hinges permit the ready removal of the fall C, in order to clear the trap.

Having now fully described my invention, what I claim as new, and desire to secure by Letters Patent, is—

1. In combination with the fall of an animal-trap of the character shown, the magnet A and its armature B, arranged to operate substantially as described.

2. In combination with hooks $k$ and attached drowning-weights W, the shelves or pins K, located upon the interior walls of the well D, for the purposes set forth.

In testimony that I claim the foregoing as my own I affix my signature in presence of two witnesses.

CHANCY R. JENNE.

Witnesses:
 H. GREEN,
 W. H. JOHNSON.